United States Patent
Masato

(10) Patent No.: US 7,888,832 B2
(45) Date of Patent: Feb. 15, 2011

(54) VIBRATION MOTOR

(75) Inventor: Nakamura Masato, Ueda (JP)

(73) Assignees: Sanyo Seimitsu Co., Ltd., Nagano-ken (JP); Sanyo Electric Co., Ltd., Moriguchi-shi (JP)

( * ) Notice: Subject to any disclaimer, the term of this patent is extended or adjusted under 35 U.S.C. 154(b) by 218 days.

(21) Appl. No.: 12/350,473

(22) Filed: Jan. 8, 2009

(65) Prior Publication Data

US 2009/0184596 A1    Jul. 23, 2009

(30) Foreign Application Priority Data

Jan. 21, 2008    (JP) .............................. 2008-010488

(51) Int. Cl.
    *H02K 7/075* (2006.01)
(52) U.S. Cl. .......................................... 310/81; 310/91
(58) Field of Classification Search .................. 310/81
    See application file for complete search history.

(56) References Cited

U.S. PATENT DOCUMENTS

| | | | | |
|---|---|---|---|---|
| 6,081,055 A * | 6/2000 | Narusawa | ..................... | 310/81 |
| 6,133,657 A * | 10/2000 | Semenik et al. | ............... | 310/81 |
| 7,045,921 B2 * | 5/2006 | Takagi et al. | .................. | 310/89 |
| 7,567,002 B2 * | 7/2009 | Takagi et al. | .................. | 310/81 |
| 7,589,446 B2 * | 9/2009 | Suzuki et al. | ................. | 310/81 |
| 7,679,240 B2 * | 3/2010 | Kono | ........................... | 310/81 |
| 7,709,983 B2 * | 5/2010 | Umehara et al. | .............. | 310/81 |
| 2006/0284501 A1 * | 12/2006 | Takagi et al. | .................. | 310/81 |
| 2008/0278013 A1 * | 11/2008 | Umehara et al. | .............. | 310/81 |
| 2009/0218896 A1 * | 9/2009 | Uchiumi et al. | ............... | 310/81 |

* cited by examiner

*Primary Examiner*—Burton Mullins
(74) *Attorney, Agent, or Firm*—Kratz, Quintos & Hanson, LLP

(57) ABSTRACT

A vibration motor having mounting hardware with a width dimension able to be kept within a thickness of a motor case, that is, a vibration motor provided with a vibration motor body attaching an eccentric weight to a motor shaft sticking out from a bearing part of a motor case and attaching a pair of motor terminals to a plastic end cap closing an opening of the motor case and with mounting hardware carrying this vibration motor body and to be set on a board, wherein the mounting hardware has a raised bottom flat-shaped part facing a barrel circumference of the motor case, oriented in an axial direction, and to be bonded to mounting patterns on the board, a collar-shaped support piece extending from this raised bottom flat-shaped part and fit over the bearing part in the axial direction, and a plug-in support piece extending from the raised bottom flat-shaped part to the opening side and plugged into first and second positioning slots provided in the plastic end cap in the axial direction.

4 Claims, 6 Drawing Sheets

VIBRATION MOTOR

CROSS REFERENCE TO RELATED APPLICATION

The present invention contains subject matter related to Japanese Patent Application No. 2008-010488, filed in the Japan Patent Office on Jan. 21, 2008, the entire contents of which being incorporated herein by reference.

BACKGROUND OF THE INVENTION

1. Field of the Invention

The present invention relates to a vibration motor suitable for surface mounting on a printed circuit board by reflow soldering.

2. Description of the Related Art

As the vibration motor of a structure suitable for surface mounting to a printed circuit board, for example, as disclosed in Japanese Patent Publication (A) No. 11-234943 (FIGS. 1 to 3), there is known one having a vibration motor body attaching an eccentric weight to one end of a motor shaft, mounting hardware provided with a pair of clamping pieces receiving a motor case of this vibration motor body from above and holding it raised at its bottom, and a pair of motor terminals attached to a plastic end cap (end bracket) closing an opening of the motor case at the side opposite to the eccentric weight wherein a flat-shaped bottom surface of a metal mounting frame and the pair of motor terminals are made to closely contact mounting patterns and a pair of power feed patterns of the printed circuit board by coating by a cream solder and are fastened by reflow soldering.

However, in the above vibration motor, there was the following problem. That is, since the motor case is clamped by the elastic force of the pair of clamping pieces open at the top, the pair of clamping pieces stick out in the width direction more than the thickness of the motor case and therefore that much more of an area of the board is occupied.

SUMMARY OF THE INVENTION

Therefore, in view of the above problem, an object of the present invention is to provide a vibration motor having mounting hardware with a width dimension able to be kept within a thickness of a motor case.

To solve the above problem, the vibration motor according to the present invention is a vibration motor provided with a vibration motor body attaching an eccentric weight to a motor shaft sticking out from a projection at one end side of a motor case and attaching a pair of motor terminals to a plastic end cap closing an opening of the motor case at the side opposite to the projection and with mounting hardware carrying this vibration motor body and to be set on a board, wherein the mounting hardware has a raised bottom flat-shaped part facing a barrel circumference of the motor case, oriented in an axial direction, and to be bonded to mounting patterns on the board, a collar-shaped support piece extending from this raised bottom flat-shaped part and fit over the projection in the axial direction, and a plug-in support piece extending from the raised bottom flat-shaped part to the side opposite to the projection and plugged into positioning slots provided in the plastic end cap in the axial direction.

In the assembly of this vibration motor, the plug-in support piece of the mounting hardware is moved along the axial direction of the barrel circumference of the motor case from the projection side to the side opposite to the projection whereby the plug-in support piece is plugged into the positioning slots of the plastic end cap and the collar-shaped support piece is fit over the projection and thereby the mounting hardware is joined with the motor case, then the eccentric weight can be attached to the motor shaft sticking out from the projection, so the assembly work can be facilitated. Further, the positioning slots of the plastic end cap can be provided within the thickness of the motor case and the two support pieces of the mounting hardware also are kept within the thickness of the motor case, so the raised bottom flat-shaped part of the mounting hardware also can be kept within the thickness of the motor case and the area occupied on the board can be substantially kept to the area occupied by the vibration motor. Further, this mounting hardware is simple in configuration, so manufacture is easy and the cost can be lowered.

Preferably, the mounting hardware has a weld plate part connecting from the raised bottom flat-shaped part to the plug-in support piece and contacting the barrel circumference, and this weld plate part and the barrel circumference are welded together. The vibration motor body and the mounting hardware can be strongly joined together.

Further, each of the motor terminals has a connecting piece to be bonded to a corresponding power feed pattern of the board, the plastic end cap has first and second spacer parts interposed between the connecting pieces and the opening side of the barrel circumference, the positioning slots are first and second positioning slots provided corresponding to the first and second spacer parts and separated from each other in a thickness direction of the motor case, and vicinities of two side edges of the plug-in support piece are fit into the first and second positioning slots.

Further, the weld plate part is broader in width than the plug-in support piece. In the weld plate part, both the front end edges sticking out in the width direction from the two side edges of the plug-in support piece abut against the front end faces of the first and second spacer parts.

BRIEF DESCRIPTION OF THE DRAWINGS

These and other objects and features of the present invention will become clearer from the following description of the preferred embodiments given with reference to the attached drawings, wherein:

FIG. 1A is a perspective view of a vibration motor according to an embodiment of the present invention, while FIG. 2A is a front view of the same vibration motor, while FIG. 6A is a perspective view showing an end cap used for the same vibration motor, while

DESCRIPTION OF THE PREFERRED EMBODIMENTS

Next, embodiments of the present invention will be explained based on the attached drawings.

Figure 1A:
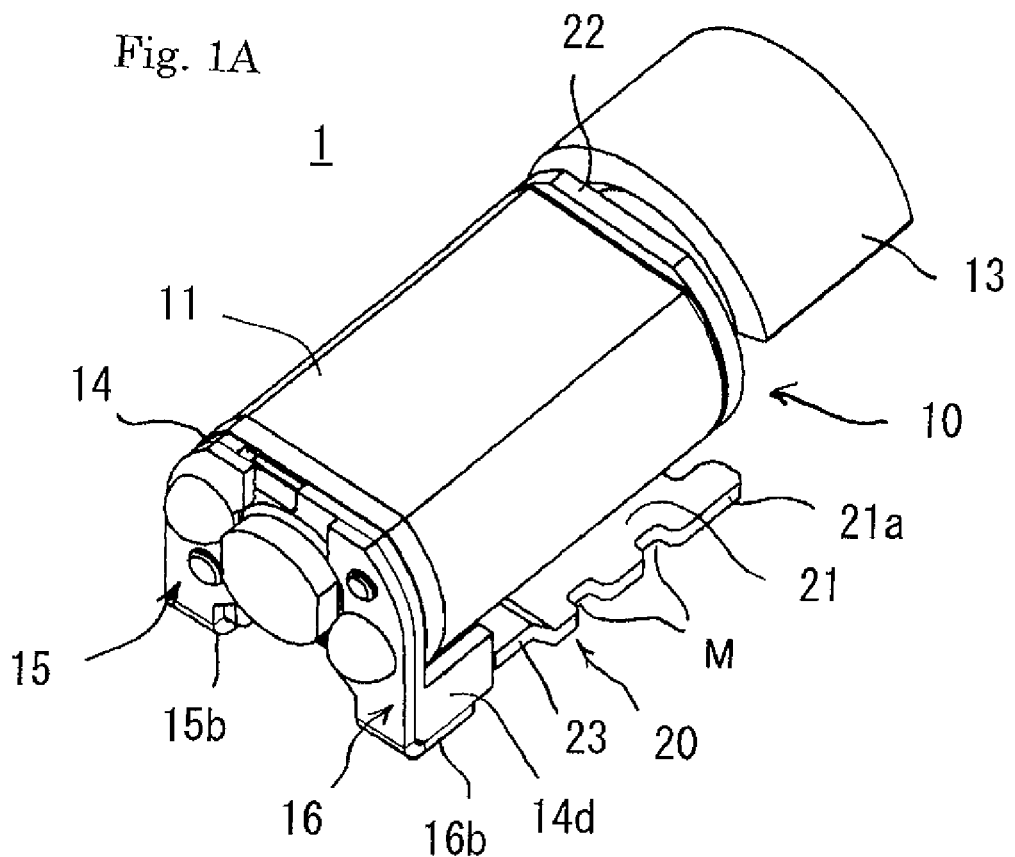
Figure 1B:
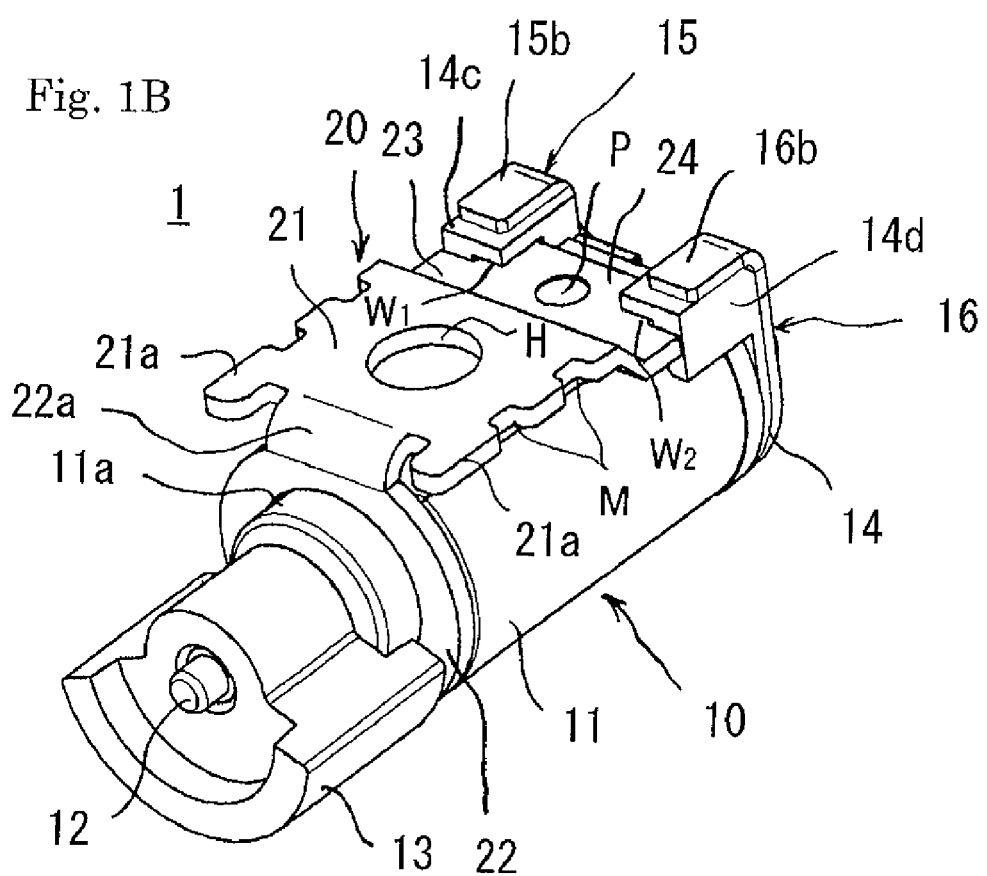
FIG. 1B is a perspective view of the same vibration motor seen from the rear side.
Figure 2A:
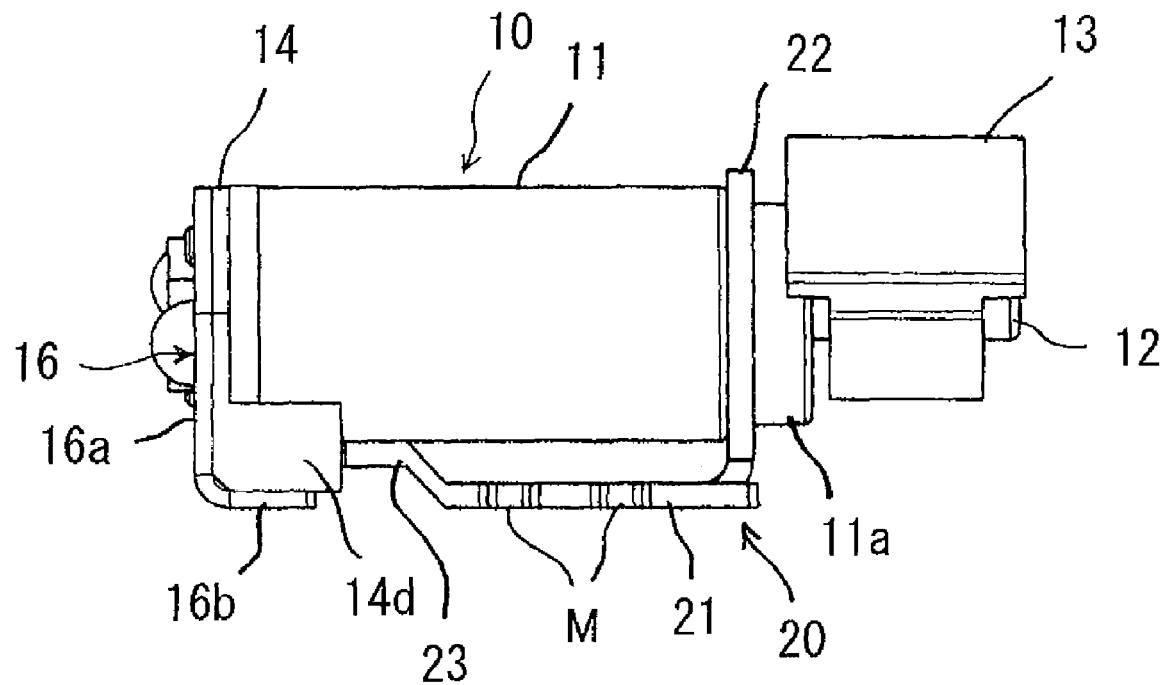
Figure 2B:
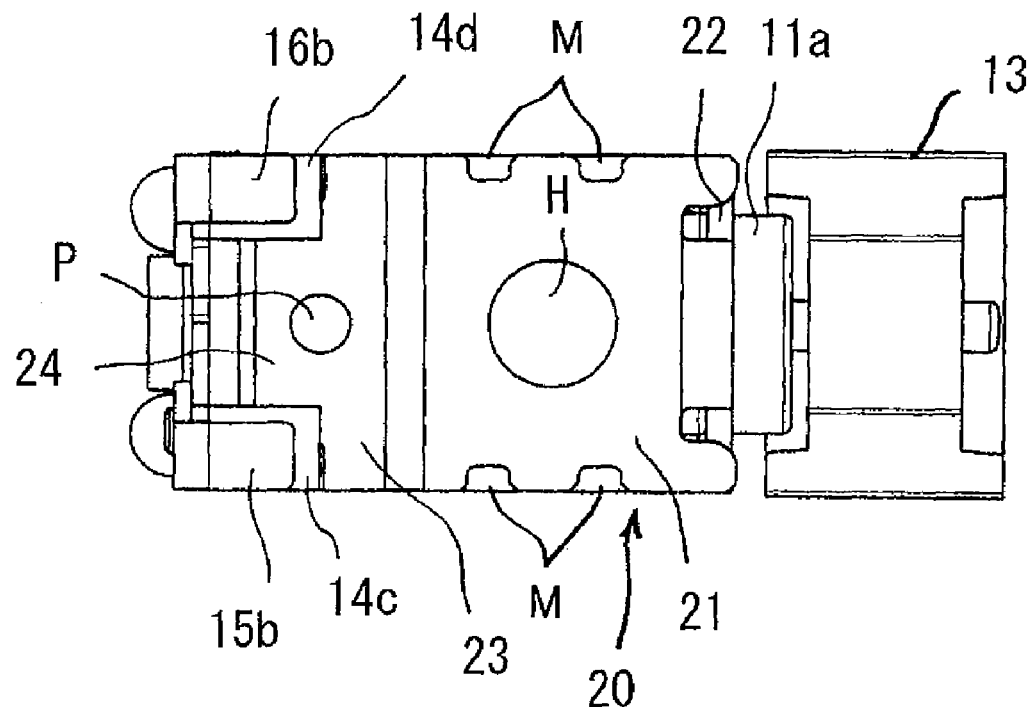
FIG. 2B is a bottom view of the same vibration motor.
Figure 3A:
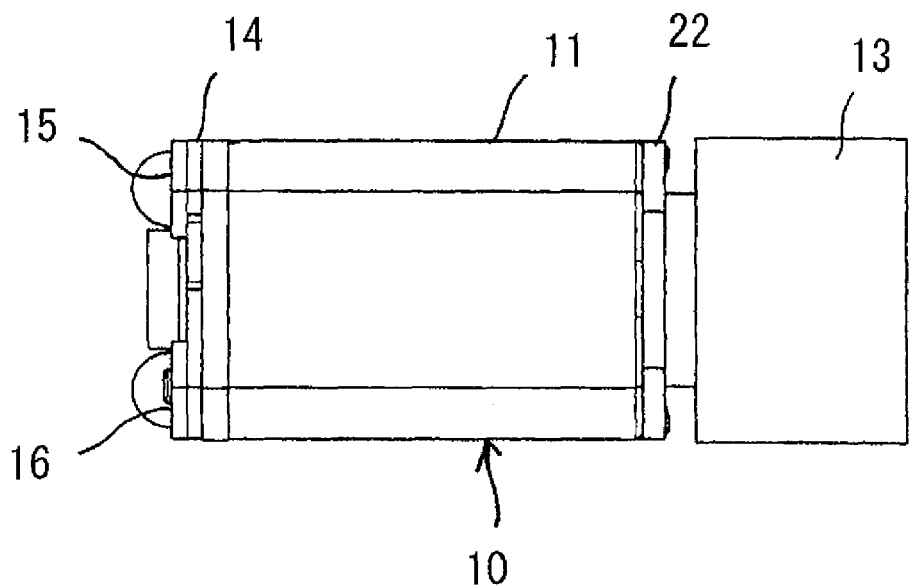
FIG. 3A is a plan view of the same vibration motor.
Figure 3B:
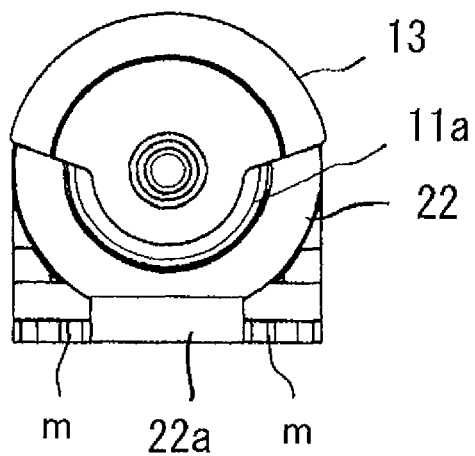
FIG. 3B is a right side view of the same vibration motor.
Figure 3C:
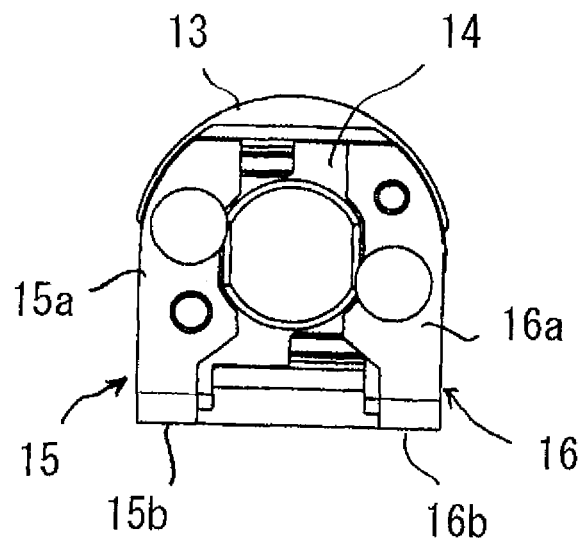
FIG. 3C is a left side view of the same vibration motor.
Figure 4:
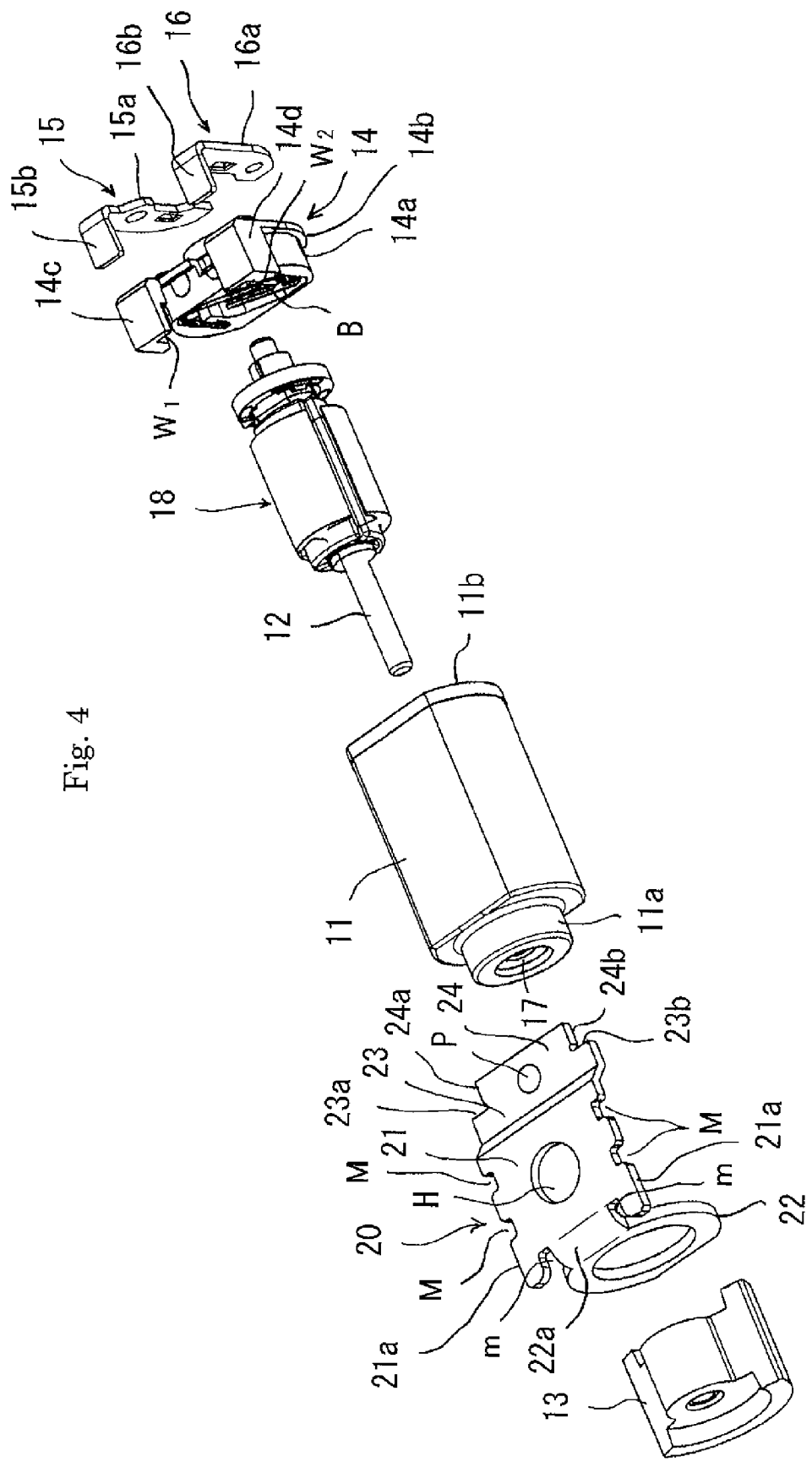
FIG. 4 is an assembled perspective view of the same vibration motor.

FIG. 1A is a perspective view of a vibration motor according to an embodiment of the present invention, FIG. 1B is a perspective view of the same vibration motor seen from the rear side, FIG. 2A is a front view of the same vibration motor, FIG. 2B is a bottom view of the same vibration motor, FIG. 3A is a plan view of the same vibration motor, FIG. 3B is a right side view of the same vibration motor, FIG. 3C is a left side view of the same vibration motor, and FIG. 4 is an assembled perspective view of the same vibration motor.

In the figures, 1 indicates a vibration motor, 10 indicates a vibration motor body, 11 indicates a motor case, 11a indicates a bearing part, 11b indicates a opening, 12 indicates a motor shaft, 13 indicates an eccentric weight, 14 indicates a plastic end cap, 14a indicates a brush holder part, 14b indicates a flange part, 14c indicates a first spacer part, 14d indicates a second spacer part, 15 and 16 indicate motor terminals, 15a and 16a indicate attaching pieces, 15b and 16b indicate connecting pieces, 17 indicates a bearing, 18 indicates a rotor, 20 indicates a mounting hardware, 21 indicates a raised bottom flat-shaped part, 21a indicates a front projecting piece, 22 indicates a collar-shaped support piece, 22a indicates a bent part, 23 indicates a weld plate part, 23a and 23b indicate front end edges, 24 indicates a plug-in support piece, 24a and 24b indicate side edges, B indicates a flange pair, H indicates a solder holding hole, M indicates a solder holding notch, m indicates a notch, P indicates a spot weld portion, S indicates a space, $V_1$ and $V_2$ indicate grooves, $W_1$ indicates a first positioning slot, and $W_2$ indicates a second positioning slot The vibration motor 1 of this embodiment has a vibration motor body 10 and a mounting hardware 20 carrying this. The vibration motor body 10 attaches an eccentric weight 13 to a motor shaft 12 sticking out from a bearing part 11a at one end side of an oblong-shaped motor case 11 and attaches a pair of motor terminals 15 and 16 to a plastic end cap 14 closing an opening 11b of the motor case 11. Note that in this embodiment, the bearing part 11a is a bearing housing part holding a bearing 17, but the invention may also be structured without the bearing part 11a and with part of the bearing 17 exposed. At the inner circumferential surface of the motor case 11, a pair of permanent magnets (not shown) are affixed. A rotor 18 is inserted from the opening 11b to be housed inside the case, and the motor shaft 12 sticks out from the bearing 17.

Figure 5A:
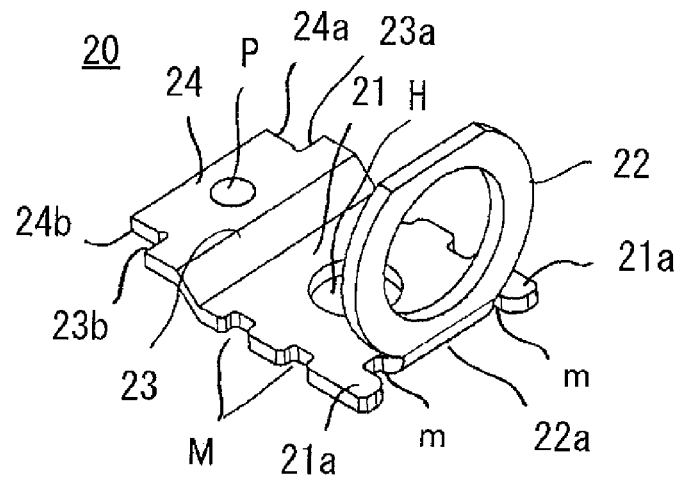
FIG. 5A is a perspective view showing mounting hardware used for the same vibration motor.
Figure 5B:
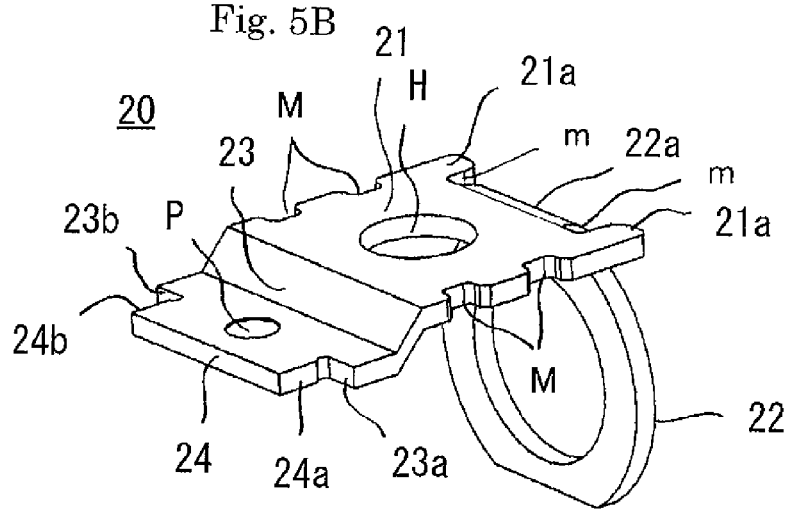
FIG. 5B is a perspective view of the same mounting hardware seen from the rear side.
Figure 5C:
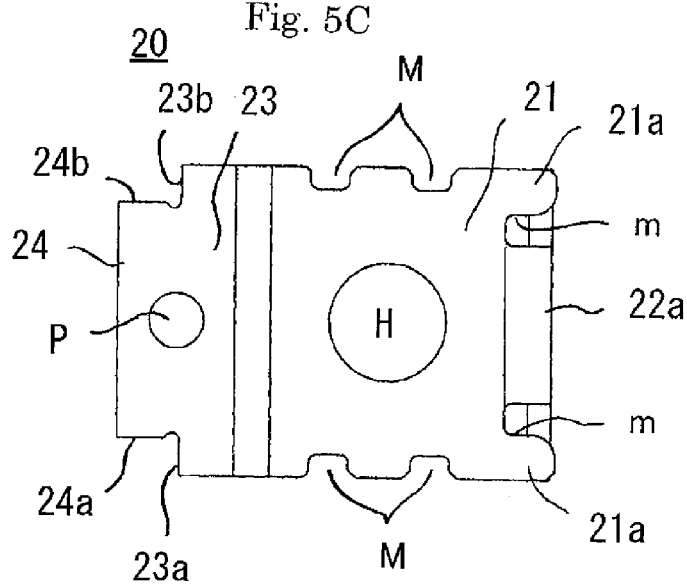
FIG. 5C is a bottom view of the same mounting hardware.
Figure 6A:
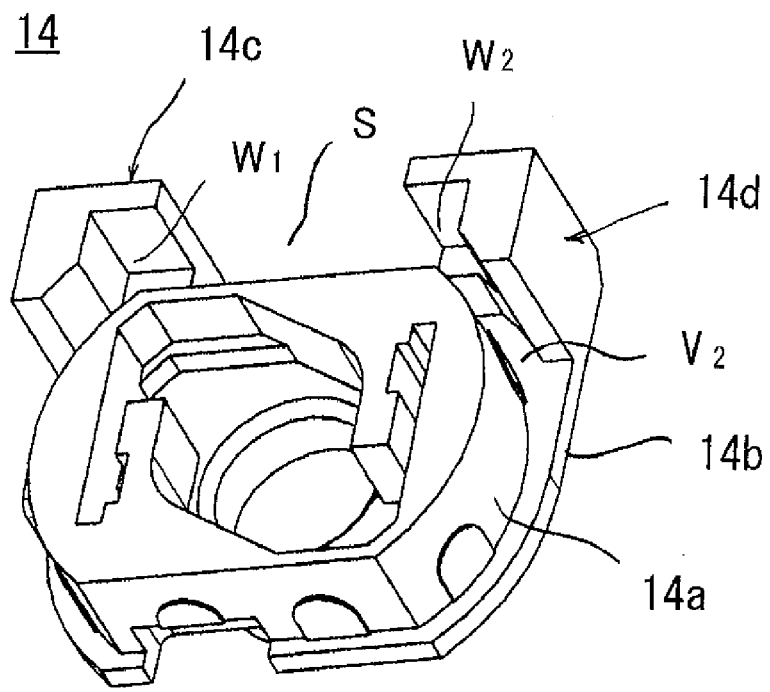
Figure 6B:
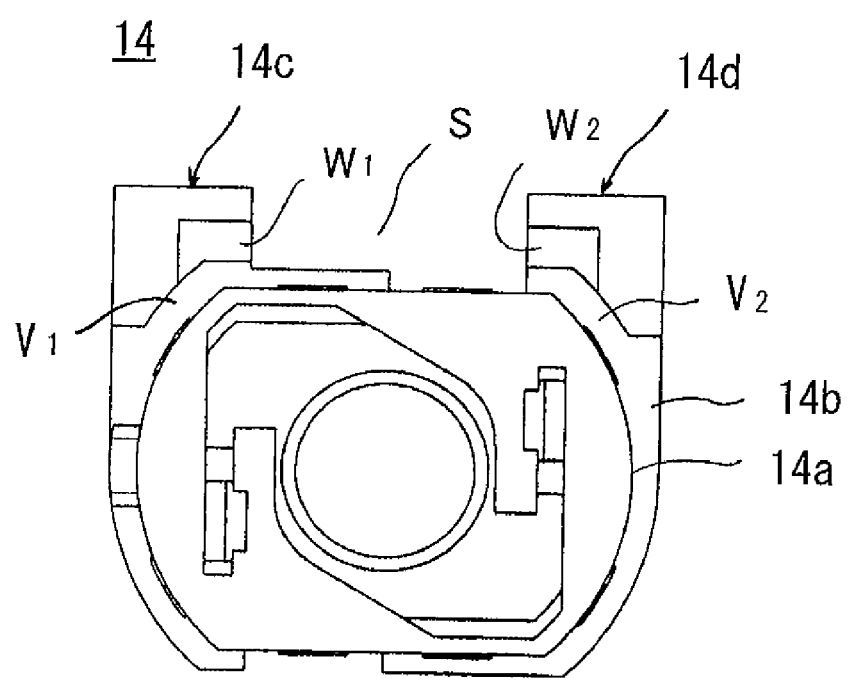
FIG. 6B is a plan view of the same end cap.

The plastic end cap 14, as shown in FIGS. 6A and 6B, has an oblong-shaped brush holder part 14a holding a flange pair B (see FIG. 5) in its inside space and fitting inside the opening 11b, a flange part 14b defining a depth of insertion of this brush holder part 14a, and first and second spacer parts 14c and 14d separated from the brush holder part 14a by the grooves $V_1$ and $V_2$ and standing up like columns from adjoining corners of the flange part 14b—all integrally formed. The first spacer part 14c and the second spacer part 14d face each other across a space S. The first spacer part 14c has a first positioning slot $W_1$ opened at its front end side, the groove $V_1$ side, and the space S side, while the second spacer part 14d has a second positioning slot $W_2$ opened at its front end side, the groove $V_2$ side, and the space S side.

The motor terminals 15 and 16 have attaching pieces 15a and 16a overlaying the end face of the plastic end cap 14 and soldered to conduction members (not shown) of the flange pair B and connecting pieces 15b and 16b extending bent from the attaching pieces 15a and 16a, overlaying the bottom surfaces of the first and second spacer parts 14c and 14d, and connected corresponding to the power feed patterns on the board (not shown).

The mounting hardware 20, as shown in FIGS. 5A to 5C, has a raised bottom flat-shaped part 21 oriented facing a barrel flat surface of the motor case 11 in the axial direction and to be bonded to mounting patterns of the board (not shown), a collar-shaped support piece 22 extending bent from this raised bottom flat-shaped part 21 and inserted over the bearing part 11a in the axial direction, a weld plate part 23 extending from the raised bottom flat-shaped part 21 to the opening 11b side and in contact with the barrel flat surface of the motor case 11, and a plug-in support piece 24 extending from this weld plate part 23 to the opening 11b side in a narrow width and plugged into the space S of the plastic end cap 14 in the axial direction. The vicinities of the two side edges 24a and 24b of the plug-in support piece 24 are fit into the first and second positioning slots $W_1$ and $W_2$, whereby the front end edges 23a and 23b of the weld plate part 23 abut against the front end faces of the first and second spacer parts 14c and 14d.

The raised bottom flat-shaped part 21 has a solder holding hole H. At the two side edges, pluralities of solder holding notches M are formed. Further, at the two sides of a bent part 22a of the collar-shaped support piece 22, front projecting pieces 21a and 21a are formed sticking out to the collar-shaped support piece 22 side across the notches m.

The weld plate part 23 is bent from the raised bottom flat-shaped part 21 and is welded to the barrel flat surface of the motor case 11 at the spot weld portion P straddling the weld plate part 23 and the plug-in support piece 24.

In the assembly of this vibration motor 1, the plug-in support piece 24 of the mounting hardware 20 is moved along the axial direction of the barrel flat surface of the motor case 11 from the bearing part 11a side to the opening 11b side, whereby the two side edges 24a and 24b of the plug-in support piece 24 are plugged into the first and second positioning slots $W_1$ and $W_2$ and the collar-shaped support piece 22 is inserted over the bearing part 11a so that the mounting hardware 20 is integrally joined with the motor case 11. The assembly is spot welded at the spot weld portion P, then the eccentric weight 13 can be attached to the motor shaft 12 sticking out from the bearing part 11a, so the assembly work can be simplified. Further, the first and second positioning slots $W_1$ and $W_2$ of the plastic end cap 14 can be provided within the thickness of the motor case 11 and the plug-in support piece 24 of the mounting hardware 20 can also be kept within the thickness of the motor case 11, so the raised bottom flat-shaped part 21 of the mounting hardware 20 can also be kept within the thickness of the motor case 11 and, as shown in FIG. 3A, the mounting hardware 20 does not stick out from the vibration motor body 10 and the occupied area of the board can be suppressed. Furthermore, this mounting hardware 20 is simple in structure, so manufacture is easy and the cost can be lowered.

While the invention has been described with reference to specific embodiments chosen for purpose of illustration, it should be apparent that numerous modifications could be made thereto by those skilled in the art without departing from the basic concept and scope of the invention.

The invention claimed is:

1. A vibration motor provided with a vibration motor body attaching an eccentric weight to a motor shaft sticking out from a projection at one end side of a motor case and attaching a pair of motor terminals to a plastic end cap closing an opening of said motor case at the side opposite to the projection and with mounting hardware carrying this vibration motor body and to be set on a board, wherein said mounting hardware has a raised bottom flat-shaped part facing a barrel circumference of said motor case, oriented in an axial direction, and to be bonded to mounting patterns on said board, a collar-shaped support piece extending from this raised bottom flat-shaped part and fit over said projection in the axial direction, and a plug-in support piece extending from said raised bottom flat-shaped part to the side opposite to the projection and plugged into positioning slots provided in said plastic end cap in the axial direction.

2. A vibration motor as set forth in claim 1, wherein said mounting hardware has a weld plate part connecting from said raised bottom flat-shaped part to said plug-in support piece and contacting said barrel circumference and this weld plate part and said barrel circumference are welded together.

3. A vibration motor as set forth in claim 1, wherein each of said motor terminals has a connecting piece to be bonded to a corresponding power feed pattern of said board, said plastic end cap has first and second spacer parts interposed between said connecting pieces and said opening side of said barrel circumference, said positioning slots are first and second positioning slots provided corresponding to said first and second spacer parts and separated from each other in a thickness direction of said motor case, and vicinities of two side edges of said plug-in support piece are fit into the first and second positioning slots.

4. A vibration motor as set forth in claim 3, wherein said weld plate part is broader in width than said plug-in support piece and, in said weld plate part, both the front end edges sticking out in the width direction from the two side edges of said plug-in support piece abut against the front end faces of said first and second spacer parts.

* * * * *